United States Patent [19]
Brockway et al.

[11] 4,098,934
[45] Jul. 4, 1978

[54] SHATTER RESISTANT GLASS CONTAINER

[75] Inventors: M. Clifford Brockway, Columbus; Robert E. Sharpe, Worthington, both of Ohio

[73] Assignee: Liberty Glass Company, Sapulpa, Okla.

[21] Appl. No.: 624,785

[22] Filed: Oct. 23, 1975

Related U.S. Application Data

[63] Continuation of Ser. No. 364,094, May 25, 1973, abandoned.

[51] Int. Cl.² ............................................... B32B 17/10
[52] U.S. Cl. ................................ 428/35; 215/DIG. 6; 427/385 A; 428/426; 428/441; 428/442
[58] Field of Search ................. 428/35, 426, 441, 442; 215/12 R, DIG. 6; 427/385 A

[56] References Cited
U.S. PATENT DOCUMENTS

| | | | |
|---|---|---|---|
| 2,929,525 | 3/1960 | Glover et al. | 215/DIG. 6 |
| 3,014,607 | 12/1961 | Barnby et al. | 215/DIG. 6 |
| 3,131,077 | 4/1964 | Barnby et al. | 215/DIG. 6 |
| 3,376,246 | 4/1968 | Valentine et al. | 260/31.6 |
| 3,492,252 | 1/1970 | Euchner et al. | 260/8 |
| 3,503,918 | 3/1970 | LeSota et al. | 260/29.7 |
| 3,738,524 | 6/1973 | Richie | 215/12 R |
| 3,772,061 | 11/1973 | McCoy et al. | 260/29.4 UA |
| 3,823,032 | 7/1974 | Ukai | 428/35 |

Primary Examiner—Ronald H. Smith
Assistant Examiner—Stuart D. Frenkel
Attorney, Agent, or Firm—Koenig, Senniger, Powers & Leavitt

[57] ABSTRACT

A container having a high mechanical service strength and shatter resistance comprises a glass container body and an overlying containment coating constituted by a plastic film. The mechanical properties of the film are such that, when subjected to tensile testing at a film extension rate of 10 in./min., the film exhibits a tensile strength of at least about 300 lbs./sq. in., an elongation of at least about 80%, and a modulus of elasticity in tension of not more than about 1,000 lbs./sq. in. throughout the course of the extension of the film.

17 Claims, No Drawings

SHATTER RESISTANT GLASS CONTAINER

This is a continuation of application Ser. No. 364,094, filed May 25, 1973, now abandoned.

BACKGROUND OF THE INVENTION

This invention relates to the field of glass containers and more particularly to a container of improved mechanical service strength and shatter resistance having an outside containment coating constituted by a plastic film.

In the container industry, substantial efforts have been devoted to developing methods for improving the impact and burst strength of glass containers without significantly adding to the cost of producing such containers. Improvement in impact and burst strength can provide not only important economic benefits through reduced attrition, but can also make critical contributions to the personal safety of those who fill, handle and use glass containers.

A substantial effort has been underway in the art to develop containment coatings which improve the resistance of a glass beverage container to impact or burst failure. In recognition of the fact that prevention of such failure under all possible conditions of handling is an objective whose economical attainment is difficult, if not impossible, much effort has also been devoted to the development of means for mitigating the consequences of the failure of a glass container. Thus, important objects have been to minimize both the degree of fragmentation and the extent of scatter of the fragments produced when a glass bottle fails.

Each of the properties of the impact resistance, burst strength, resistance to fragmentation and minimization of scatter is particularly important where a beverage bottle is used for packaging a carbonated beverage. Bottles for carbonated beverages are routinely exposed to internal pressures in the range of about 50 psig. If and when such a bottle is broken, the resulting fragments, particularly if they are very small, can be propelled at high velocity by the carbon dioxide which is released. If these fragments strike a person, serious injuries may result. Occasionally a beverage bottle explodes due to the force of internal pressure alone. Serious injuries have been caused by exploding beverage bottles.

As a means of improving the mechanical properties of beverage bottles in the above-noted respects, it has been proposed to provide such bottles with a "containment" or protective coating. Compositions and processes are known, for example, which may be utilized to provide a glass container with a relatively thick coating of styrene foam. Styrene foam coatings are esthetically undesirable since they are white and opaque, thus preventing observation of the contents of the bottle. Glass containers also are known to have an outer lubricating film of polyethylene over an intermediate layer of a metal oxide such as a tin or titanium oxide for abrasion protective purposes. However, these do not in themselves provide satisfactory impact resistance and containment.

As a result of the conditions encountered in the filling, handling and usage of a beverage bottle, a containment coating must meet a number of diverse criteria in addition to the mechanical properties noted above. Thus, in order to maintain its own integrity and effectiveness, the coating should be substantially resistant to abrasion. To avoid interference with visual observation of the bottle's contents, the coating preferably possesses a high degree of clarity. To survive general usage and, in particular, to survive bottling plant processing, the coating should be resistant to both alkali and hot water. In order to minimize fire hazards in the process of coating the bottle, the containment coating composition should not include significant proportions of flammable organic solvents, and desirably should be water based. It is also desirable that the containment coating be subject to incineration without generating significant quantities of either toxic or obnoxious gases. Finally, the containment coating must be inexpensive to formulate and apply, failing which its use and application to beverage bottles is not feasible or practically economic.

A glass container having a generally satisfactory acrylic containment coating is described in the copending and coassigned application of McCoy and Sharpe Ser. No. 189,392 filed Oct. 14, 1971. The coatings described in this application have a high degree of clarity and alkali resistance and are also characterized by a relatively high degree of lubricity which minimizes damage which might otherwise be incurred in the handling incident to the bottle manufacturing process. The coatings described in the aforesaid application also provide protection against abrasion, impart improved burst and impact strength and reduce the extent of fragmentation and scatter in the event that a bottle to which whey have been applied does fail. Although substantially superior to bottles provided with many previously known coatings, the bottles described by McCoy and Sharpe still have a somewhat limited mechanical service strength and the degree of fragmentation and scatter is still significant when gas-pressurized bottles produced in accordance with their invention fail under severe impact. An important need has, therefore, remained in the art for a glass container having an improved containment coating so that the mechanical service strength and shatter resistance is substantially improved over glass containers previously known.

SUMMARY OF THE INVENTION

Among the several objects of the present invention, therefore, may be noted the provision of a glass container having improved mechanical service strength and shatter resistance; the provision of such a container provided with a coating effective for containment of the fragments of glass which result from failure of the glass body of the container; the provision of such a container in which the coating has a high degree of clarity; the provision of such a container in which the coating has satisfactory resistance to alkali solution and hot water; the provision of such a container whose coating, when incinerated, does not generate significant quantities of toxic or obnoxious gases; the provision of methods for the production of such a glass container; and the provision of such methods whose practice does not involve serious flammability or air pollution hazards. Other objects and features will be in part apparent and in part pointed out hereinafter.

Briefly, therefore, the present invention is directed to a container having high mechanical service strength and shatter resistance comprising a glass container body and a plastic containment coating film overlying the glass body. The mechanical properties of the plastic film are such that, when subjected to tensile testing at room temperature and a film extension rate of 10 in./min., it exhibits a tensile strength of at least about 300 lbs./sq. in., an elongation of at least about 80% and a modulus of elasticity in tension which is less than about 1,000 lbs./sq. in. substantially throughout the course of the extension of the film.

The invention also includes a method of imparting improved mechanical service strength to a container having a glass body. The method comprises applying to the outside surface of the container a plastic coating film of the character described above.

DESCRIPTION OF THE PREFERRED EMBODIMENTS

In accordance with the present invention, it has been discovered that substantially improved containment can be achieved by providing a glass bottle or the like with an overlying containment coating constituted by a plastic film having a relatively low resistance to elastic deformation. Specifically, it has been discovered that substantially improved containment is realized if the plastic film utilized as a containment coating has an elastic modulus in tension which is less than about 1,000 lbs./sq. in. at any point during a room temperature tensile test in which the film is extended at a rate of approximately 10 in./min. It is particularly preferred that the modulus determined under these conditions is less than 750 lbs./sq. in. substantially throughout the tensile test.

Although we do not wish to be bound to any particular theory, it is believed that a relatively low modulus of elasticity in tension allows the containment coating film on the outside wall of a glass bottle to deform rapidly in the event that the bottle bursts or breaks and, thus, avoids propagation of the fracture into the film and limits the tendency for the film to tear as a result of fracture in the bottle wall. As a result of rapid film deformation in response to the breakage of the glass body of the container, tensile stresses in the film are limited and the energy of breakage is absorbed over a relatively extended period of time, so that the ability of the film to retain its integrity is maximized. Where the energy of breakage is sufficient for the film to be burst or torn, the low modulus serves to limit both the number of fragments into which the breaking bottle divides and the scatter of such fragments.

Many plastic materials exhibit a relatively high modulus of elasticity up to a yield point and a generally lower modulus from the yield point to the failure point. Both the initial modulus at a low degree of elongation and the secondary modulus between the yield point and the failure point of the film are considered important. A low initial modulus minimizes the probability of brittle fracture of the film at the instant that the glass body of the bottle itself breaks while a low modulus beyond the yield point allows the energy of breakage to be absorbed over a relatively long period of time and thus serves not only to minimize the probability of bursting or tearing of the film but also reduces the velocity of such fragments as may be projected from the main body of the container. In accordance with the present invention, it is essential that the modulus be less than about 1,000 lbs./sq. in. at any time during the 10 in./min. extension of the film and preferable that the modulus be less than 750 lbs./sq. in. substantially throughout the extension of the film.

For maximum containment, it is also desirable that the elongation of the plastic film be as great as possible. High elongations allow not only a greater deformation of the film before rupture but also act in concert with a low modulus in allowing a greater period of time over which the energy of breakage of the glass body of the container may be absorbed. The plastic film used should generally have an elongation of greater than about 80% as measured in a 10 in./min. room temperature tensile test, preferably greater than 200%.

Surprisingly, it has been discovered that a high tensile strength is not an essential characteristic of an effective containment coating film. Thus, a low elastic modulus film having a tensile strength of only about 600 lbs./sq. in. has been found to provide substantially superior containment as compared to a film having a tensile strength on the order of 4,000 lbs./sq. in. but an initial elastic modulus in tension of approximately 70,000 lbs./sq. in. Nonetheless, some minimum tensile strength is necessary and it is generally preferred that the tensile strength of the containment coating film be at least about 300 lbs./sq. in. as determined by a room temperature tensile test at a film extension rate of 10 in./min.

Effective containment is obtained with relatively thin coatings of a film having the properties described above. Mechanical strength and shatter resistance are enhanced by coatings as thin as 1 mil and materially enhanced by coatings as thin as 2 mils. Generally, it is convenient to provide coatings having thicknesses in the range of about 2 mils to 4 mils.

Essentially any plastic film having the requisite mechanical properties set forth above is effective to provide a high degree of containment. As those skilled in the art will appreciate, moreover, a variety of methods can be employed to provide a film having these mechanical properties on a container having a glass body. In a particularly preferred embodiment of the invention, the outside surface of such a container is contacted with a thixotropic acrylic coating composition comprising an acrylic latex which contains at least about 46.5% by weight, preferably at least 48.0% by weight, resin solids, and said composition is thereafter cured. Any acrylic latex which is curable to provide a plastic film having the necessary mechanical properties provides a containment coating which substantially increases the container's resistance to both breakage and abrasion. An effective containment coating is thereby provided at relatively modest cost.

Many acrylic coatings afford the additional advantages of a relatively high degree of clarity and generally good resistance to hot alkaline solutions such as those which may be encountered in the bottle washing operation of a commerical beverage bottling plant. By coating the glass body container with an aqueous based coating formulation such as an acrylic latex, moreover, drying and curing of the coating can be accomplished without significant air pollution problems, solvent recovery requirements, or flammability hazards.

An especially suitable acrylic latex useful as a coating composition in the preparation of the containers of the invention is that sold under the trade designation "Hycar 2679" by B. F. Goodrich Company. Hycar 2679 contains approximately 48.0% by weight resin solids, has a pH between about 4.0 and 5.0, and a glass transition temperature of $-3°$ C. The resin solids of this latex are constituted by a copolymer of ethyl acrylate and acrylonitrile in which the repeating units derived from the ethyl acrylate constitute approximately 85% by weight and the repeating units derived from acrylonitrile constitute approximately 12% by weight of the resin. This latex is readily curable into a clear film which exhibits a tensile strength of approximately 600–1200 lbs./sq. in., an elongation of about 200–300%, and a modulus of elasticity in tension of approximately 300–800 lbs./sq. in. when subjected to tensile testing at a film extension rate of 10 in./min. These properties provide exceptionally effective containment. A further advantage of Hycar 2679 arises from the fact that it may be incinerated witout generating large quantities of toxic or obnoxious gases, making it especially suitable for use in nonreturnable bottles.

Curing of an acrylic latex coating is conveniently conducted in a forced air oven, typically at temperatures of 400°–500° F. for 3 to 15 minutes. To obtain the desired degree of alkali resistance, a relatively thorough cure of the acrylic latex coating is generally desirable. Hycar 2679, for example, has some inherent cross-linking capability and a sufficiently extended cure will render the coating highly resistant to alkali attack. A wet Hycar 2679 coating may be rapidly cured in approximately 3 to 4 minutes at a temperature of about 450° F. to provide an effective alkali resistant containment coating. Such severe curing conditions, however, may lead to blisters or other unsightly defects in the containment film. It has been found that such defects may be minimized or avoided by partially drying the wet coating in static air before curing it. Adequate static air drying can be accomplished at room temperature in a period of approximately 5 minutes or in a shorter period of time at elevated air temperature, for example, 2 minutes at 200° F. A Hycar 2679 coating dried and cured in accordance with this suggested schedule will resist attack for 60 minutes or more in the presence of a 150° F. caustic solution containing 2.5% NaOH and 0.5% $Na_3PO_4$.

A high level of alkali resistance may alternatively be provided with less extended drying and curing operations by inclusion of a cross-linking agent in the coating formulation. Two types of cross-linking agents in particular, hexamethoxymethylmelamine and methylated urea formaldehyde resins, impart alkali resistance without significant sacrifice in the clarity or color of the film obtained when the coating formulation is cured. Particularly suitable cross-linking agents from the standpoint of film clarity are the hexamethoxymethylmelamines sold under the trade designations "Cymel 300", "301" or "303" and the methylated urea formaldehyde resins sold under the trade designations "Beetle 60" and "Beetle 65" by American Cyanamid Company. Where their presence is not absolutely necessary for the provision of alkali resistance, however, cross-linking agents are preferably withheld from the containment coating formulation. The presence of significant proportions of hexamethoxymethylmelamine or methylated urea formaldehyde resin tends to substantially increase the rigidity of the cured coating film and reduce the containment capability of the film. Up to about 2 parts of cross-linker per 100 parts by weight of latex, however, can be tolerated where necessary; for example, where alkali resistance is important and process or equipment limitations preclude a curing operation adequate to impart the necessary alkali resistance in the absence of cross-linking agents.

In accordance with the method of the invention, the coating compositions may be applied to the outside surface of a glass body container by any suitable means, for example, spraying. Where an acrylic latex based coating composition is utilized, however, the container surface is preferably contacted with a composition of the invention by dipping the container therein. In such a dipping process, the container is conveniently withdrawn from the coating composition bath at a rate of between about 4 in./min. and about 3 ft./min., typically about 1 ft./min. Withdrawal rates of less than about 20 in./min. are usually preferred to insure a high degree of uniformity of thickness throughout the film. Under the dynamics of this type of operation, it is preferable that the coating formulation have a slightly lower viscosity than is desired for dimensional integrity of the wet film under the low shear conditions which are maintained after application of the coating composition is complete. Thus, the coating composition of the invention is preferably thixotropic and for most dip coating processes it is preferred that the coating formulation have a Brookfield viscosity of between about 2,000 and about 9,000 centipoises at 1 rpm, using a No. 2 spindle, and a Brookfield viscosity of between about 600 and about 2,400 centipoises at 5 rpm, using a No. 2 spindle. At a withdrawal rate of 1 ft./min., a coating composition having these viscosity characteristics provides about a 4 mil thick wet film with minimal run, sag, crack or craze during or after the curing process.

To provide the desired viscosity characteristics, inclusion of a thickener in the latex coating formulation is preferred. A polyacrylamide such as that sold under the trade designation "Polyhall 295" by Stein Hall and Company is highly suitable for this purpose. Other satisfactory thickeners include the high molecular weight poly(ethylene oxide) sold under the trade designation "Polyox WSR-301" and the hydroxyethyl cellulose sold under the trade designation "Cellosize QP 15,000" by Union Carbide Corporation, the hydroxyethyl cellulose sold under the trade designation "Natrosol 250 HHR" by Hercules, Inc., and the cross-linked acrylic emulsion copolymer (28% solids) sold under the trade designation "Acrysol ASE 60" by Rohm & Haas Company. Each thickener is preferably included in the formulation as a 1% aqueous solution. Typically, between about 1 and about 6 parts of such a solution is sufficient to impart the desired viscosity characteristics to a formulation containing 100 parts of acrylic latex. Preferably, however, the proportion of thickener is maintained below 0.04 parts (4 parts 1% solution) per 100 parts latex in order to minimize any tendency to blistering in the cured film.

Plastic films which possess the desired mechanical properties outlined above do not always possess a very high degree of lubricity. In fact, plastic films which have a very low modulus and high elongation are in some instances slightly tacky. Where necessary or desired, however, lubricity can readily be imparted to the containers of the invention by applying an overcoat of a lubricious material over the containment coating film. Typical materials useful as lubricious coatings are silicone resins. A highly suitable silicone emulsion which may be sprayed upon the container of the invention to provide lubricity is that sold under the trade designation "SM 2032" by General Electric Company.

The following examples illustrate the invention:

EXAMPLE 1

Ten ounce capacity beverage bottles were dip coated with a coating solution constituted by an acrylic latex emulsion which is sold under the trade designation "Hycar 2679" by the B. F. Goodrich Chemical Company. Coating was accomplished by immersing the bottles to within about ⅛ inch of the finish in a latex bath, and withdrawing the bottles at a controlled uniform rate of 12 in./min. The wet coatings on the bottles were dried and cured by exposing them to 200° F. for 1 minute and 450° F. for 3 minutes in a forced air oven..

The cured coatings were transparent and glossy. Upon exposure to a solution containing 2½% sodium hydroxide and 0.5% trisodium phosphate for 30 minutes at 150° F., the coating film remained intact although some blushing was apparent. The viscosity of the coating composition and the average cured coating weights are set forth in Table 1, below.

EXAMPLE 2

Ten ounce beverage bottles were coated with "Hycar 2679" in the manner described in Example 1. The wet coatings were air dried in static room temperature air for several minutes and then cured for either 2 or 4 minutes at 450° F. in a forced air oven. The cured coatings were transparent, smooth and glossy. Upon exposure to a caustic solution containing 2.5% sodium hydroxide and 0.5% trisodium phosphate at 150° F., the coatings cured for 2 minutes satisfactorily withstood 15 minutes exposure and the coatings cured for 4 minutes remained intact after 60 minutes exposure.

EXAMPLE 3

To 100 parts by weight of "Hycar 2679" was added 1 part by weight of a 1% by weight aqueous solution of a polyacrylamide sold under the trade designation "Polyhall 295" by Stein Hall and Company. The resulting mixture was agitated at low speed until the components thereof were uniformly distributed. Beverage bottles were dip coated with this mixture in the manner described in Example 1 and the wet coatings were dried and cured by subjecting them to 210° F. for 1 minute followed by 450° F. for 3 minutes in a forced air oven. The viscosity of the coating mixture and the average weight of the cured coatings are set forth in Table 1, below.

EXAMPLE 4

A coating composition was prepared in the manner described in Example 3, except that 2 parts by weight of a 1% by weight solution of "Polyhall 295" was utilized. Beverage bottles were dip coated with this composition and the wet coatings cured in the manner described in Example 1. The cured coatings were transparent and glossy. The viscosity of the coating composition and the average weight of the cured coatings are set forth in Table 1, below.

EXAMPLE 5

A coating composition was prepared in the manner described in Example 3, except that 3 parts by weight of a 1% by weight solution of "Polyhall 295" was used. Beverage bottles were coated with this composition and the wet coatings cured in the manner described in Example 1. The viscosity of the coating composition and the average weight of the cured coatings are set forth in Table 1, below.

EXAMPLE 6

A coating composition was prepared in the manner described in Example 3, except that 4 parts by weight of a 1% by weight solution of "Polyhall 295" was utilized. Beverage bottles were coated with this composition and the wet coatings cured in the manner described in Example 1. The viscosity of the coating composition and the average weight of the cured coatings are set forth in Table 1.

Table 1

| Example | Parts of PolyHall 295 (1% solution) per 100 parts of Hycar 2679 | Viscosity[a] of Coating Composition (Centipoise) | Coating Wt. grams (10-ounce bottle) |
|---|---|---|---|
| 1 | 0 | 800 | 2.13 |
| 3 | 1 | 930 | 2.26 |
| 4 | 2 | 1100 | 2.28 |
| 5 | 3 | 1320 | 2.42 |
| 6 | 4 | 1480 | 2.63 |

[a]Brookfield RVT Viscometer, No. 2 Spindle, 5 rpm

EXAMPLE 7

Hexamethyoxymethylmelamine sold under the trade designation "Cymel 303" (1 part by weight) was added to 100 parts by weight of "Hycar 2679". The resulting mixture was agitated at low speed until the components were uniformly distributed. Beverage bottles were coated with this composition and the wet coatings dried and cured in the manner described in Example 2. The cured coatings were exposed to a caustic solution containing 2.5% by weight sodium hydroxide and 0.5% by weight trisodium phosphate at 150° F. The coatings cured for 2 minutes satisfactorily withstood 25 minutes exposure in the caustic solution, while the coating which had been cured for 4 minutes remained intact after 60 minutes exposure to the caustic solution.

EXAMPLE 8

A coating composition was prepared in the manner described in Example 7, except that 2 parts by weight of "Cymel 303" were used. Beverage bottles were coated with this composition and the wet coatings dried and cured in the manner described in Example 1. The coated and cured bottles were then exposed to a caustic solution containing 2.5% by weight sodium hydroxide and 0.5% by weight trisodium phosphate at 150° F. for 40 minutes. All of the coatings remained intact after such exposure. Additional bottles were coated with the coating composition of this example in the manner described in Example 2 and the wet coatings cured in the manner described in the latter example. The coated and cured bottles were exposed to a caustic solution containing 2.5% by weight sodium hydroxide and 0.5% by weight trisodium phosphate. The coatings which had been cured for 2 minutes were intact after 30 minutes exposure, while the coatings which had been cured for 4 minutes withstood 60 minutes exposure to the caustic solution.

EXAMPLE 9

A coating composition was prepared in the manner described in Example 7, except that 4 parts by weight of "Cymel 303" was used. Beverage bottles were coated with this composition and the wet coatings cured in the manner described in Example 2. The coatings cured for both 2 minutes and 4 minutes remained intact after 60 minutes exposure to a 150° F. caustic solution containing 2.5% by weight sodium hydroxide and 0.5% by weight trisodium phosphate.

EXAMPLE 10

A number of 10 oz. beverage bottles were respectively coated with compositions corresponding to those prepared in Examples 1, 2, 4, 7, 8 and 9 and the wet coatings respectively cured in the manners described in those examples. After the coatings were cured, the caustic resistance of the cured coatings was tested by exposure of the bottles to a 150° F. caustic solution containing 2.5% NaOH and 0.5% $Na_3PO_4$. The results of this test are set forth in Table 2.

Containment test were also conducted. For purposes of this test, certain of the bottles were filled with a sufficient quantity of water to leave a 12 cc. free head space. The free volume of each bottle was then filled with argon to a pressure of 57 psig, the bottles were capped, and certain of the bottles were dropped from a horizontal orientation and a height of 4 feet onto a 1/16 inch thick vinyl asbestos tile fixed to a concrete support. To provide a basis of comparison, a control sample constituted by a number of standard, uncoated production bottles were similarly filled with water leaving a 12 cc. head space, pressured at 57 psig argon and subjected to drop tests in the same fashion as the coated bottles. To determine the degree of containment, a count was made of the proportion of each bottle contained in major clusters (i.e., clusters containing 25% or more by weight of the total bottle) and the location of these clusters relative to the point of impact was determined. Also the total number of fracture fragments having at least one dimension of ¼ inch or larger were counted. The results of those tests are set forth in Table 2.

| Blend | Component | Amount |
|---|---|---|
| | a copolymer containing 70% by weight repeating units derived from ethyl acrylate and a 30% by weight repeating units derived from acrylonitrile, sold under the trade designation "Hycar 2600 × 138" by the B. F. Goodrich Company | 100 parts |
| | hexamethoxymethylmelamine, sold by American Cyanamid under the trade designation "Cymel 301" | 4 parts |
| | 1% by weight aqueous solution of polyacrylamide sold by Stein, Hall Co. under the trade designation "Polyhall 295" | 5 parts |
| Blend B | "Hycar 2600 × 138" | 100 parts |
| | ethylene/vinyl acetate latex, sold by Air Products and Chemicals Inc. under the trade designation "Airflex 500" | 10 parts |
| | vinyl acetate acrylic latex sold by Borden Co. under the trade designation "Polyco 2114" | 10 parts |
| | hexamethoxymethylmelamine, sold by American Cyanamid under the trade designation "Cymel 303" | 4 parts |
| | 1% aqueous solution "Polyhall 295" | 6 parts |
| Blend C | "Hycar 2679" | 100 parts |
| | "Cymel 303" | 2 parts |
| Blend D | "Hycar 2679" | 100 parts |
| | 1% aqueous solution of "Poly-Hall 295" | 2 parts |
| Blend E | "Hycar 2679" | 100 parts |
| | 1% aqueous solution of "Polyhall 295" | 4 parts |

Each of these compositions was cast into a film and cured on a flat glass plate which had been precoated with a lubricious material to facilitate removal of the film after curing. Blend D and a coating composition constituted by "Hycar 2679" latex free of any additives were also used to provide containment coatings on 10

Table 2
Caustic Resistance and Containment Properties of Coated Bottles

| Example | Air Dry | Minutes at 210° F. | Minutes at 450° F. | Resistance to 3% Caustic at 150° F., Minutes | Clusters on the foot square vinyl tile | Clusters off tile but inside a 5-foot diameter circle | Sum of clusters inside 5-foot diameter circle | Total Number of fracture fragments average |
|---|---|---|---|---|---|---|---|---|
| Control[a] | — | — | — | — | 0 | 0 | 0 | 87 |
| 1 | no | 1 | 3 | 30 | 45 | 48 | 93 | — |
| 2 | yes | — | 2 | 15 | 83 | 12 | 95 | 4 |
| 2 | yes | — | 4 | 60 | 93 | 0 | 93 | 5 |
| 4 | no | 1 | 3 | 45 | 69 | 28 | 97 | 5 |
| 6 | yes | — | 2 | 25 | — | — | — | — |
| 7 | yes | — | 4 | 60 | — | — | — | — |
| 8 | no | 1 | 3 | 40 | — | — | — | — |
| 8 | yes | — | 2 | 30 | 0 | 37 | 37 | 10 |
| 8 | yes | — | 4 | 60 | 0 | 13 | 13 | 20 |
| 9 | yes | — | 2 | 60 | — | — | — | — |
| 9 | yes | — | 4 | 60 | — | — | — | — |

[a] uncoated

The numbers listed in this table for the "percent of bottle contained in major clusters" in a particular location are averages of several runs and, thus, some of the figures are less than 25%.

EXAMPLE 11

The following acrylic latex based blends were prepared:

| Blend A | An acrylic latex containing approximately 50% by weight resin solids constituted by |
|---|---| oz. beverage bottles. Test strips (5 × 0.5 inches) of the cured films obtained from each of the aforesaid blends, including samples from the side of each beverage bottle, were then subjected to tensile tests at a film extension rate of 10 in./min. and the properties of ultimate tensile strength, elongation, and modulus of elasticity were measured. To provide a basis of comparison, the same properties were determined for commercially available vinyl chloride, polyethylene and cellulose acetate films. The result of these tensile tests, expressed as averages of several tests, together with the cure conditions for the films obtained from the various blends are set forth in Table 3.

Table 3

| Sample | Initial Thickness | Cure Min. | Conditions* Temp.F. | Ultimate Tensile Strength lbs/sq.in. | Elongation % | Initial Modulus lbs./sq.in. |
|---|---|---|---|---|---|---|
| Vinyl Film | 4 mil | — | — | 4900 | 430 | $3.3 \times 10^4$ |
| Poly Ethylene Film | 4 mil | — | — | — | >500 | $>2 \times 10^4$ |
| Cellulose Acetate | 3 mil | — | — | 11,500 | 30 | $2.4 \times 10^5$ |
| Blend A | 4.4 mil avg. | 3 | 400 | 4010 | 160 | $7.0 \times 10^4$ |
| B | 6 mil avg. | 3 | 450 | 2850 | 190 | $4.5 \times 10^4$ |
| C | 4.0 mil avg. | 4 | 400 | 1010 | 100 | $8.4 \times 10^2$ |
| D (flat plate) | 4.4 mil avg. | 4 | 400 | 690 | 230 | $3.7 \times 10^2$ |
| E | 5.2 mil avg. | 4 | 400 | 630 | 210 | $3.3 \times 10^2$ |
| D (beverage bottle) | 2.4 mil avg. | 4 | 450 | 1150 | 310 | $5.5 \times 10^2$ |
| Hycar 2679 (beverage bottle) | 2.2 mil avg. | 4 | 450 | 950 | 250 | $4.9 \times 10^2$ |

*roughly equivalent to degree of cure obtained on bottle at 450° F. for 4 min.

Each of Blends A, B, C, D and E was also applied to additional 10 oz. beverage bottles by dip coating and the wet coatings cured under conditions similar to those under which the tensile test films were cured. In drop tests conducted in the manner described in Example 10, the bottles coated with Blends D and E exhibited substantially superior containment properties, and those coated with Blend C showed significantly superior containment properties, as compared to the containment exhibited by Blends A and B. Blends D and E were decidedly superior to Blend C.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A container possessing high mechanical service strength and shatter resistance consisting essentially of a glass container body and overlying the outside surface of said body a plastic containment coating including at least one film, the mechanical properties of said coating being such that, when subjected to tensile testing at room temperature and an extension rate of at least about 10 in./min. per 5 in. of film length, the entire coating exhibits a tensile strength of at least about 300 lbs./sq. in., an elongation of at least about 80%, and a modulus of elasticity in tension which is less than about 1,000 lbs./sq. in. substantially throughout the course of the extension of the film.

2. A container as set forth in claim 1 wherein said modulus of elasticity is less than about 750 lbs./sq. in. substantially throughout the extension of the film.

3. A container as set forth in claim 1 wherein the thickness of said plastic coating is at least about 2 mils.

4. A container as set forth in claim 1 wherein said plastic comprises an acrylic plastic.

5. A container as set forth in claim 4 wherein said plastic is constituted by a copolymer of ethyl acrylate and acrylonitrile.

6. A container as set forth in claim 5 wherein said copolymer contains approximately 85% by weight repeating units derived from ethyl acrylate and approximately 12% by weight repeating units derived from acrylonitrile.

7. A container as set forth in claim 1 wherein said film is obtained by curing a coating composition comprising an acrylic latex.

8. A container as set forth in claim 7 wherein said latex includes at least about 46.5% by weight acrylic resin solids.

9. A container as set forth in claim 8 wherein said composition has a Brookfield viscosity of between about 2,000 and about 9,000 centipoises at 1 rpm and between about 600 and about 2,400 centipoises at 5 rpm.

10. A container as set forth in claim 9 wherein said composition further comprises a thickening agent selected from the group consisting of polyacrylamide, hydroxyethyl cellulose, a cross-linked acrylic resin and high molecular weight polyethylene oxide.

11. A container as set forth in claim 7 wherein said composition further comprises up to about 2 parts by weight per 100 parts by weight of said latex of a cross-linking agent selected from the group consisting of hexamethoxymethylmelamine and a methylated urea formaldehyde resin.

12. A container as set forth in claim 8 wherein said acrylic resin solids comprise a copolymer of ethyl acrylate and acrylonitrile.

13. A container as set forth in claim 12 wherein said latex has a pH of between about 4.0 and about 5.0 and said copolymer contains approximately 85% by weight of repeating units derived from ethyl acrylate and approximately 12% by weight repeating units derived from acrylonitrile.

14. A container having high mechanical service strength and shatter resistance comprising a glass container body and overlying the outside surface of said body a containment coating consisting essentially of a single-ply film of plastic material whose properties are such that, when subjected to tensile testing at room temperature and a film extension rate of at least about 10 in./min. per 5 in. of film length, said film exhibits a tensile strength of at least about 300 lbs./sq. in., an elongation of at least about 80%, and a modulus of elasticity in tension which is less that about 1,000 lbs./sq. in. substantially throughout the course of the extension of the film.

15. A container as set forth in claim 14 wherein said modulus of elasticity is less than about 750 lbs./sq. in. substantially throughout the extension of film.

16. A container as set forth in claim 14 wherein the thickness of said plastic film is at least about 2 mils.

17. A container as set forth in claim 14 wherein said plastic is an acrylic plastic.

* * * * *